United States Patent [19]

Hashida et al.

[11] Patent Number: 4,996,402
[45] Date of Patent: Feb. 26, 1991

[54] METHOD AND APPARATUS FOR CONTINUOUSLY MELTING MATERIAL BY INDUCTION HEATING

[75] Inventors: Hideo Hashida; Hideki Kanno, both of Tochigi; Senri Okada, Tokyo; Kokichi Nakamura, Tondabayashi; Haruyoshi Sumimoto, Kyoto, all of Japan

[73] Assignee: Hitachi, Ltd., Tokyo, Japan

[21] Appl. No.: 457,840

[22] Filed: Dec. 27, 1989

[30] Foreign Application Priority Data

Feb. 28, 1989 [JP] Japan .................... 01-045399

[51] Int. Cl.$^5$ .............................................. H05B 6/10
[52] U.S. Cl. .................. 219/10.41; 219/10.491; 219/10.69; 219/10.77; 266/90; 373/148; 373/140
[58] Field of Search ............ 219/10.41, 10.43, 10.491, 219/10.69, 10.75, 10.77, 10.57; 266/90, 91, 92, 94, 127, 129; 148/154; 373/140, 142, 146, 148, 150, 155, 157, 164; 75/14, 13, 15

[56] References Cited

U.S. PATENT DOCUMENTS 1,378,189  5/1921  Northrup ......................... 373/157
2,443,960  6/1948  O'Brien ........................... 266/94
3,401,227  9/1968  Dunlevy et al. ................... 373/155
3,410,548 11/1968  Sieckman et al. ................. 266/91
4,162,156  7/1979  Naffziger ......................... 373/146

FOREIGN PATENT DOCUMENTS 52-48564 12/1977 Japan .

Primary Examiner—Philip H. Leung
Attorney, Agent, or Firm—Antonelli, Terry, Stout & Kraus

[57] ABSTRACT

A method of continuously melting a material comprises the steps of depositing carbon in a crucible furnace provided with a melt outlet and an inlet in an upper portion thereof, heating the carbon by electromagnetic induction heating by an electromagnetic coil provided around the outer periphery of the furnace, continuously supplying the material to be melted onto the heated carbon through the inlet and melting the material to be melted by electromagnetic induction heating so as to cause a melt to continuously flow out of the furnace through the melt outlet. The temperature of the melt flowing out of the furnace is adjusted by controlling the ratio between the quantities of heat supplied by the electromagnetic induction heating to the carbon and to the material to be melted.

25 Claims, 3 Drawing Sheets

4,996,402

METHOD AND APPARATUS FOR CONTINUOUSLY MELTING MATERIAL BY INDUCTION HEATING

BACKGROUND OF THE INVENTION

1. FIELD OF THE INVENTION

The present invention relates to method and apparatus for continuously heating and melting a material to continuously obtain a melt at a desired temperature.

2. DESCRIPTION OF THE PRIOR ART

Cupola furnaces and crucible-type induction furnaces are well known and widely used melting cast iron. Cupolar furnaces are continuous melting furnaces by which refined melts of high quality can be continuously obtained, while induction furnaces are intermittent melting furnaces which allow fine materials to be used and components to be easily adjusted. Since both types of the furnaces have advantages and disadvantages, a double melting method which employs the combination of the two types of furnaces is now widely used. This sort of technique is disclosed in, for example, Japanese Patent Examined Publication No. 52-48564.

It is necessary to blow a large quantity of air in a cupola furnace for the purpose of burning coke at high temperature. Since the gas flow rate in the furnace is high, therefore, it is difficult to melt fine materials such as pig iron turning because they are oxidized or discharged to the outside of the furnace by the gas flow before they are melted. When it is required to obtain a melt at a high temperature, particularly, a temperature higher than 1,500° C., incomplete combustion of coke tends to occur so as to decrease the efficiency and lower the controllability of temperature.

On the other hand, a refining effect cannot be expected from an induction furnace because material is melted simply by induction, heating. The induction furnace also has a problem in that it is inconvenient to supply a melt to a continuous casting apparatus because the furnace is intermittently operable intermittently.

In addition, although an attempt has been made to heat material by using an induction coil provided at an upper part of a cupola furnace in the prior art (Japanese Patent Examined Publication No. 52-48564 referred to above), no consideration has been made of the heating of a coke layer. Thus, the disadvantage caused by the blowing of a large quantity of air has not been eliminated, and the method of efficiently obtaining high temperatures has not been improved.

Namely, the above-mentioned double melting method employing the combination of an induction furnace and a combustion furnace is a proposal concerning a continuous refining technique in which electromagnetic induction heating and combustion heating using a burner are used for heating a low-temperature portion and a high-temperature portion, respectively. However, this proposal has the problems discussed below and does not reach a practical level.

Namely, although induction heating is used for heating a low-temperature portion in which a material to be melted is charged, the induction heating preheats only the metal to be melted. The preheating uses electric power and thus is costly and not practical. In addition, since a combustion method using a burner is used for heating the high-temperature portion, this method suffers from a decrease in the efficiency caused by the production of CO due to incomplete combustion of fuel, an increase in the size of the apparatus used and the necessity for a pollution prevention measure, which are caused by the occurrence of a large amount of exhaust gases, and the difficulty in melting a fine material to be melted because it tends to be dispersed by a gas flow. There also, problems that reduction proceeds insufficiently due to the oxidation of metal by the oxygen in the gas used, and satisfactory refinement cannot be easily obtained due to the production of a slug of the oxidized material.

SUMMARY OF THE INVENTION

The present invention has been made with a view to solve the above-described problems of the prior art. It is an object of the present invention to provide an improved melting method which uses electromagnetic induction heating and which is capable of using fine materials such as pig iron turning and continuously obtaining a melt of a controlled high temperature and of a high quality containing small amounts of gases such as oxygen and nitrogen. It is a second object of the invention to provide an apparatus for performing the electromagnetic induction heating method.

The present invention provides a method of continuously heating and melting a material comprising the steps of forming a layer of one of a carbon material and an electrically conductive refractory material on a bottom of a furnace which is provided with a melt outlet adjacent the bottom and an inlet for the material in an upper portion; heating the layer by electromagnetic induction heating; feeding the material to be melted onto the thus heated layer and heating the material to be melted by electromagnetic induction heating in a state wherein the air flow in the furnace is substantially cut off; and causing a melt of the material to flow out of the furnace through the melt outlet; and controlling the ratio between the quantities of heat supplied by the electromagnetic induction heating to the layer and to the material to be melted so as to adjust the temperature of the melt flowing out of the furnace.

The present invention also provides an apparatus for continuously melting a material comprising a furnace having a melt outlet adapted to be opened and closed and provided adjacent to a bottom of the furnace and an inlet provided in an upper portion of the furnace so that one of a carbon material and an electrically conductive refractory material is inserted through the inlet and deposited on the bottom of the furnace, the material to be melted being charged through the inlet onto the material deposited, an electromagnetic coil provided around the outer periphery of the furnace, a high frequency energy applying means for supplying an electric power to the electromagnetic coil, and means for controlling the high frequency energy. The electromagnetic coil has a function of melting the material by electromagnetic induction heating in a state wherein the air flow in the furnace is substantially cut off. The temperature of a melt flowing out of the furnace is controlled by the control means which controls a ratio between the quantities of heat supplied by the electromagnetic induction heating to the deposited material and the material to be melted.

The carbon material or the electrically conductive refractory material has an electrical resistance greater than that of a metal. However, since the coke which has a specific resistance of about 5,000 $\mu\Omega$cm can be sufficiently heated by high-frequency induction heating, the carbon material can be heated to a temperature required for melting a metal in an atmosphere without air, i.e. without using combustion, by applying a part of the amount of induction heating for melting a material to be melted, e.g., a metal, to the coke which is charged as a heating medium on the bottom of the furnace. This method is, unlike a combustion method, capable of forming an atmosphere at high temperature in which substantially no oxygen and nitrogen are present, and of controlling the temperature by changing the ratio of the quantity of heat supplied to the coke. Specifically, an atmosphere at a constant temperature can be obtained regardless of the melting speed by keeping constant the ratio between the amounts of the coke and the metal in the induction heating region in the furnace to keep constant the ratio of the power absorbed by the coke. For example, 20 to 50% of the heat of induction heating can be applied to the coke and the remainder, 80 to 50%, is applied to the metal so that heating and refining can be performed such that the melted metal is lowered through the atmosphere. This method is capable of melting a fine material such as pig iron turning, which is easily oxidized, at a constant temperature without producing any slug. In the case where cast iron is to be melted, coke having a specific resistance less than 3,000 $\mu\Omega$cm is not only expensive and economically unsuitable but also causes a significant increase in the amount of carbon in the melted metal due to the progress of graphitization. Coke having a specific resistance over 10,000 $\Omega\mu$cm cannot easily be heated. It is, therefore, preferable to use coke having a specific resistance of from 3,000 to 10,000 $\mu\Omega$cm. Since the apparatus of the present invention is a continuous melting apparatus, the apparatus is characterized by its capability of preheating material continuously and efficiently. If the ratio of the amount of induction heating applied to the carbon material to the total amount of heat including the amount of heat by the preheating is less than 20%, the temperature of the melt discharged out of the furnace is as low as below 1,400° C. because the heating after melting is reduced. If the ratio exceeds 50%, the heating after melting is increased, so that the temperature of the melt discharged exceeds 1,600° C. to cause overheating. Thus, a preferable operation is performed at a ratio within the rage of from 20 to 50%, as described above. In addition, with a power of high-frequency energy of less than 100 kW and a frequency of above 5,000 Hz, the size of the apparatus is excessively reduced to an impractical size. On the other hand, with a power of over 10,000 kW and a frequency of less than 500 Hz, the size of the apparatus is excessively increased to a size which is unsuitable for heating metals generally used for preparing cast iron. Further, there is a tendency that the temperature of the melt discharged is low at the start of a work because the furnace is insufficiently heated. In this case, the temperature can be increased by temporarily closing the melt outlet, preliminarily charging the furnace with a metal such as pig iron turning, storing a melted metal in the furnace, and induction-heating the melt.

In the induction heating, it is effective to connect the high-frequency energy controlling means between the high-frequency energy applying means (power source) and the electromagnetic coil to thereby stabilize the output. In other words, when the material to be melted is fed into the furnace, the impedance of the coil is changed depending upon the properties of the material and the state of the material fed into the furnace. However, this change in the impedance can be stably compensated for by changing the voltage or current by the controlling means, thereby keeping the output constant.

With the present invention, it is possible to efficiently melt a fine material such as pig iron turning. Any oxidized material can be reduced by refining effect by the heated carbon and a strongly reducing atmosphere. The present invention, therefore, provides an advantage that a metal of good quality containing small amounts of gases can be obtained continuously, at an industrial scale and substantially without producing any slug.

The above objects, features and advantages of the present invention will be made more apparent by the following description.

DESCRIPTION OF THE PREFERRED EMBODIMENT

Figure 1:
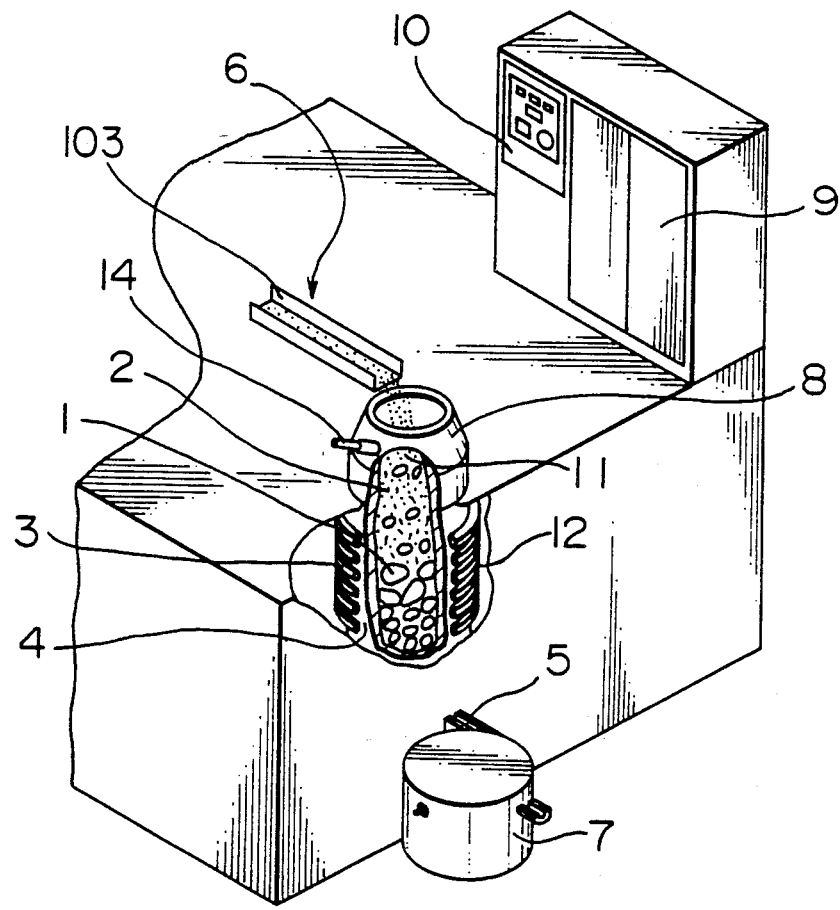
FIG. 1 is a perspective view of a principal part of an embodiment of the apparatus of the present invention.
Figure 2:
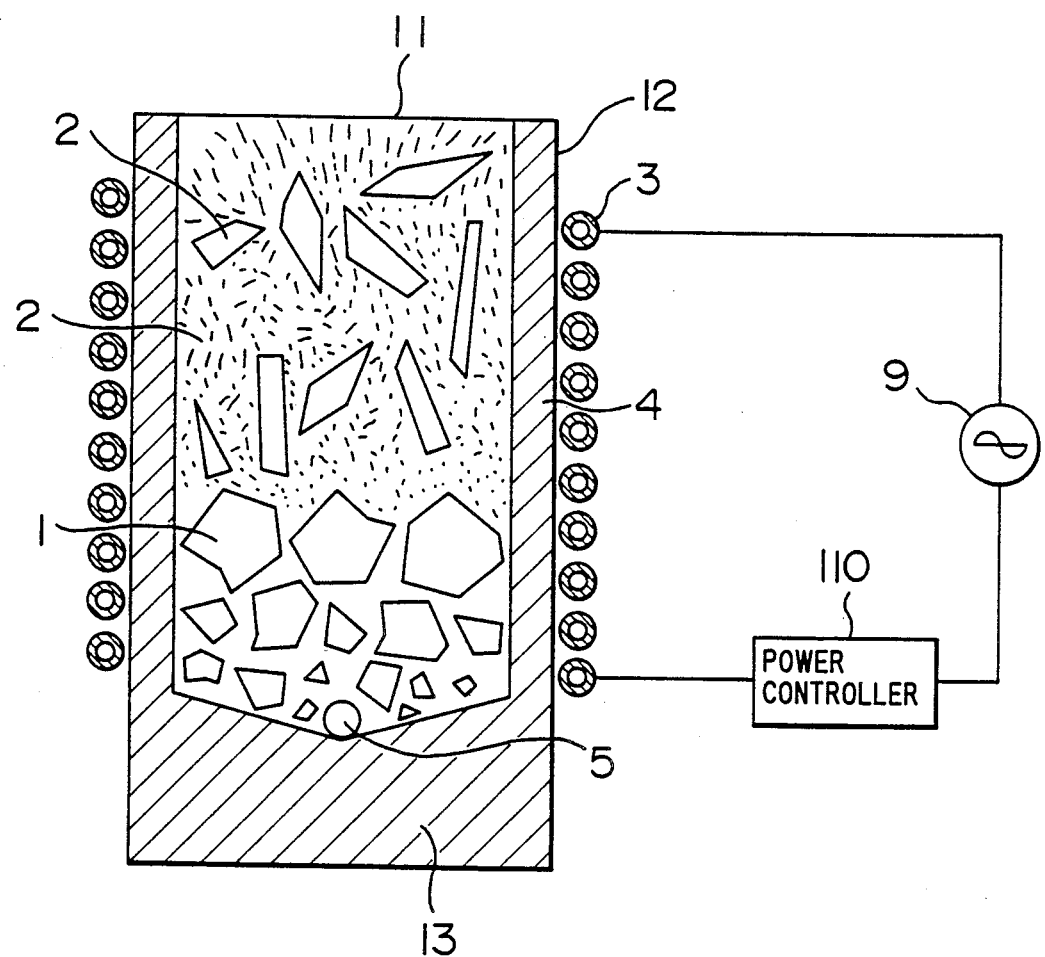
FIG. 2 is a vertical sectional view of a furnace.

FIGS. 1 and 2 show an embodiment of an apparatus for continuously melting a material according to the present invention.

The apparatus includes a furnace 12 comprising a substantially cylindrical refractory material 4 having a bottom 13 provided with a melt outlet 5 which can be opened and closed. The furnace has an inlet 11 for the material provided in an upper portion thereof. The refractory material 4 has an internal diameter of 400 mm and a height of 700 mm. In a portion above the inlet 11 for the material to be melted is provided an annular preheating means 8 having a burner 14 which is operative with a usual gas or liquid fuel. A supply means 6 for supplying the material 2 to the inlet 11 through the preheating means 8 is disposed above the preheating means 8. The supply means 6 will be described in detail later with reference to FIGS. 3 and 4. An electromagnetic coil 3 is disposed around the outer periphery of the refractory material 4 of the furnace 12 in a form in which it is wound around the axis of the furnace 12. The electromagnetic coil 3 is supplied with electric power from a high-frequency energy applying means, i.e., a power source 9, through a power controller 110. A controlling means 10 is interposed between the power source 9 and the supply means 6 for the purpose of controlling high-frequency energy. The frequency of the high-frequency energy supplied from the power source is 3,000 Hz, and the output thereof is 175 kW. A melt flowing out from the melt outlet 5 is received by a forehearth 7 having a capacity of 150 kg.

A carbon material 1 is stacked on the bottom 13 of the furnace 12. The material 2 to be melted is fed from the supply means 6 onto the carbon material 1.

An example of the carbon material 1 is coke which has a specific resistance of 5,000 $\mu\Omega$cm. An example of the material 2 to be melted is a mixture consisting, for example, of 4 parts of return scrap, 3 parts of pig iron turning, 3 parts of electromagnetic steel plate press scrap, and a small amount of additives such as iron silicide.

Although a proportion of 0 to 100% can be used as the proportion of the fine materials, such as the pig iron turning and the electromagnetic steel plate press scrap, in the material 2 to be melted, a proportion of 20 to 60% is preferably used for facilitating the induction heating and shielding the atmosphere in the induction heating furnace. In the above-described continuously heating and melting apparatus, at the start of a melting operation, the thickness of the coke layer remaining in the furnace 12 after the last operation is first adjusted to be about 250 mm from the bottom 13 of the furnace 12. If the thickness is less than 250 mm, new coke is supplied. In this state, the coke had a total weight of about 30 kg consisting of about 100 of coke blocks, the maximum weight of a single coke block being 2 kg. After the coke has been completely charged, an electric power is supplied to the electromagnetic coil 3 from the power source 9. The controlling means 110 has a function of compensating the variation in the impedance of the electromagnetic coil 3 by a variation in the voltage thereof. The coke blocks of larger sizes which are placed in an upper portion of the coke layer efficiently absorb the power and generate heat, while the coke particles of smaller sizes in a lower portion of the coke layer do not easily generate heat and are thus heated by high-temperature gases sucked from the furnace through the melt outlet 5. At this time, the voltage was 1,120 V, and the input was 82 kW. When the upper portion of the coke layer is about 1,600° C., the melt outlet 5 is closed. Then, 20 kg of pig iron turning is charged as the metal material, melted and stored on the bottom 13 and is heated for a predetermined time. This step causes a rapid heating in the furnace 12 and thus provides a melt at a high temperature from the beginning of the charging step. At this time, the voltage was 1,130 V and the input was 136 kW.

When the melted pig iron turning is heated to a temperature of 1,500° C. or higher, the melt outlet 5 is opened so that the melt is discharged into the forehearth 7 and, at the same time, the charge of the material 2 to be melted by the supply apparatus 6 is started. When the material 2 is charged, the upper portion of the coke layer is covered with the material, so that only the melt outlet 5 is communicated with the outside. Since the melt outlet 5 is also closed by the flow of the melt when the discharge of the melt is started, the flow of air into the furnace is substantially cut off. The charged material 2 and, particularly, the blocks of return scrap move downwardly while they are induction-heated by the electromagnetic coil 3 to a higher temperature. When the material 2 reaches the cork layer, the material 2 is melted by the heat supplied from the coke layer. The material 2 is thus melted into liquid-drops which ar further heated while downwardly moving through the coke layer and, thus, are refined by the high-temperature coke in a reducing atmosphere in which substantially no oxygen is present. The melt is discharged through the melt outlet 5.

The power is adjusted to be constant by the power source 9. When the amount of the material 2 in the furnace 12 is reduced, the impedance of the electromagnetic coil 3 is increased and the voltage exceeds 1,000 V. The controlling means 10 controls the supply means 6 so that the material to be melted is supplied into the furnace 12 until the amount of the material to be melted is increased in the furnace 12, the impedance of the electromagnetic coil 3 is reduced and the voltage is lowered below 1,000 V. Then, the supply means 6 is stopped. The power and the voltage during the operation are respectively controlled to be 173 kW and 1,000 V so that the melting operation is continuously performed. In this steady state, the temperature of the melt was about 1450° C. The time required for melting 1 ton of a material to be melted was 3.27 hours, the quantity of power input was 566 kW, the amount of the coke supplied was 11 kg, the amount of the slug produced was too small to be measured and the refractory material 4 was only slightly damaged.

In the described embodiment, the preheating means 8 provided with the burner 14 was not used. The use of the preheating means 8 with the burner 14 is effective to save the electric power and increase the rate of discharge of the melt in correspondence with the heating capacity of the preheating means 8. In addition, while the saving of power in a conventional crucible furnace is 20% or less, the use of the preheating means 8 in the present invention saves power 30%.

Table 1 below shows the relationship between the thickness of the coke layer and the input obtained when the thickness of the coke layer stacked on the bottom of the furnace was changed and heated at 1,000 V (no material to be melted was supplied).

TABLE 1

| Thickness of coke layer and input | |
|---|---|
| Thickness of coke layer (mm) | Input (kW) |
| 0 | 32 |
| 250 | 82 |
| 300 | 89 |
| 350 | 95 |

Table 2 below shows the relationship between the thickness of the coke layer and the temperature of the melt discharged, obtained when the material was supplied and melted such that the voltage and the input were kept at 1,000 V and 173 kW, respectively.

TABLE 2

| Thickness of coke layer and temperature of melt discharged | |
|---|---|
| Thickness of coke layer (mm) | Temperature (°C.) |
| 250 | 1,450 |
| 300 | 1,500 |
| 350 | 1,550 |

As will be seen from Table 2, it is only necessary to change the thickness of the coke layer to control the temperature of the melt discharged. Thus, the melting can be continuously performed for obtaining a melt at a constant temperature by simply feeding the material to be melted into the furnace as the level of the material in the furnace is lowered with the progress of the melting.

In practical operation, however, a continuous melting can be performed such that the thickness of the coke layer is set to be substantially constant and the electrical voltage is set to obtain a melt at a desired temperature level. Only when the level of the material to be melted is lowered in the furnace with a resultant increase in the voltage beyond the set level, an additional or next batch of the material to be melted is fed into the furnace to keep the melt at a substantially constant temperature level, as will be described in detail later.

Table 3 below shows the results of the analysis of the thicknesses of chills of cast irons and the gas contents thereof which were obtained by a usual cupola melting furnace, a conventional crucible induction melting furnace and the continuous melting method of the present invention. The material melted in each case contained 30% of steel scrap, and the melt discharged was adjusted to include 3.3% carbon and 2.0% silicon. The measurements were made in substantially the same conditions. As is well known, the quality of a cast iron is excellent when the thickness of chill is small and the gas content is small. It is apparent from Table 3 that the method of the present invention is excellent as compared with the other melting methods.

TABLE 3

Chill thickness and gas content obtained by various melting furnaces

| Melting furnace | Chill thickness (MM) | Oxygen content (ppm) | Nitrogen content (ppm) |
| --- | --- | --- | --- |
| Cupola | 8 | 26 | 70 |
|  | 10 | 35 | 72 |
| Conventional induction furnace | 13 | 53 | 43 |
|  | 12 | 53 | 56 |
| Furance of this invention | 3 | 24 | 24 |
|  | 3 | 33 | 43 |

Although the above description is directed to the case in which cast iron is melted by using coke, the present invention can use an electrically conductive refractory material (for example, electrically conductive ceramics) in place of coke and is capable of melting other metals such as copper alloys, ores and the like (preferably having electrical conductivity). When it is desired to reduce the amount of impurities such as zinc which easily evaporates, an air hole may be provided in the furnace so that inert gas or reducing gas is blown thereinto, whereby the evaporation of such impurities can be positively accelerated.

As can be seen from the above-described embodiment, in the present invention, a material to be melted is melted and heated in a strongly reducing atmosphere with a small gas flow, so that, even if a power-like material is used, a melt of high quality containing small amounts of oxygen and nitrogen gases can be obtained without producing any slug which was produced in the conventional methods due to oxidation.

Figure 4:
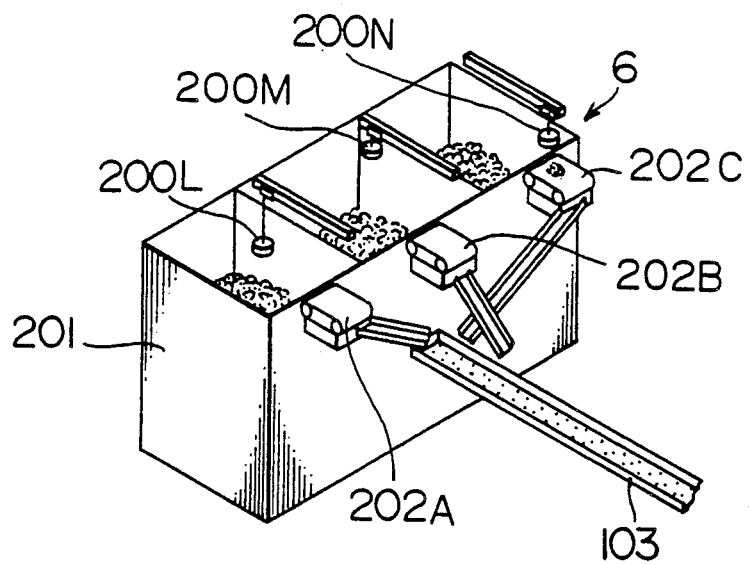
FIG. 4 is a perspective view of the arrangement of the material supply means.

A description will now be made of the arrangement and the operation of the material supplying means 6 with reference to FIGS. 3 and 4. The material supply means 6 includes feeding means 103 which comprises a belt conveyor or an oscillating conveyor and which charges the material to be melted into the furnace 12.

The material supply means 6 also includes material take-out means comprising lifting magnets 200L, 200M and 200N for picking up, for example, three-types of materials from a material hopper 201, and electrically controlled balances 202A, 202B and 202C which respectively employ strain gages for weighing the three-types of materials picked-up from the hopper 201.

The controlling means 10 has a voltage comparator 105 for judging the level of the voltage supplied from the high-frequency energy applying means 9, a reference voltage generator 106 for generating a reference voltage to be supplied for the judgement of the voltage level, and an arithmetic unit 107 for mixing the three-types of materials to be melted in a predetermined ratio on the basis of weighing data from each of the electically controlled balances 202A, 202B and 202C. The voltage comparator 105 has control lines 114 and 115 for controlling each of the material take-out means 200L, 200M and 200N such that a signal is output to the control line 115 when the voltage supplied from a line 04 is higher than the reference voltage and such that a signal is output to the control line 114 when the supply voltage is lower than the reference voltage. The arithmetic unit 107 receives data from each of the balances 202A, 202B and 202C through a line 112 and controls each of the material take-out means 200L, 200M and 200N through a line 113. The electromagnetic coil 3 of the furnace 12 has a characteristic that the impedance increases with a reduction in the amount of material in the furnace and the impedance decreases with an increase in the amount of material. The electromagnetic coil 3 is supplied with high-frequency power by the high-frequency energy applying means 9 through a conductor 108. The high-frequency energy applying means 9 is provided with a power controller 110 for keeping constant the power supplied to the coil 3. The high-frequency energy applying means 9 is also provided with a voltage converter 111 for converting the voltage, which is supplied to the electromagnetic coil 3 of the furnace 12 through the conductor 108, to a corresponding low D.C. voltage and feeding the D.C. voltage to the voltage comparator 105 of the controlling means 10.

Figure 3:
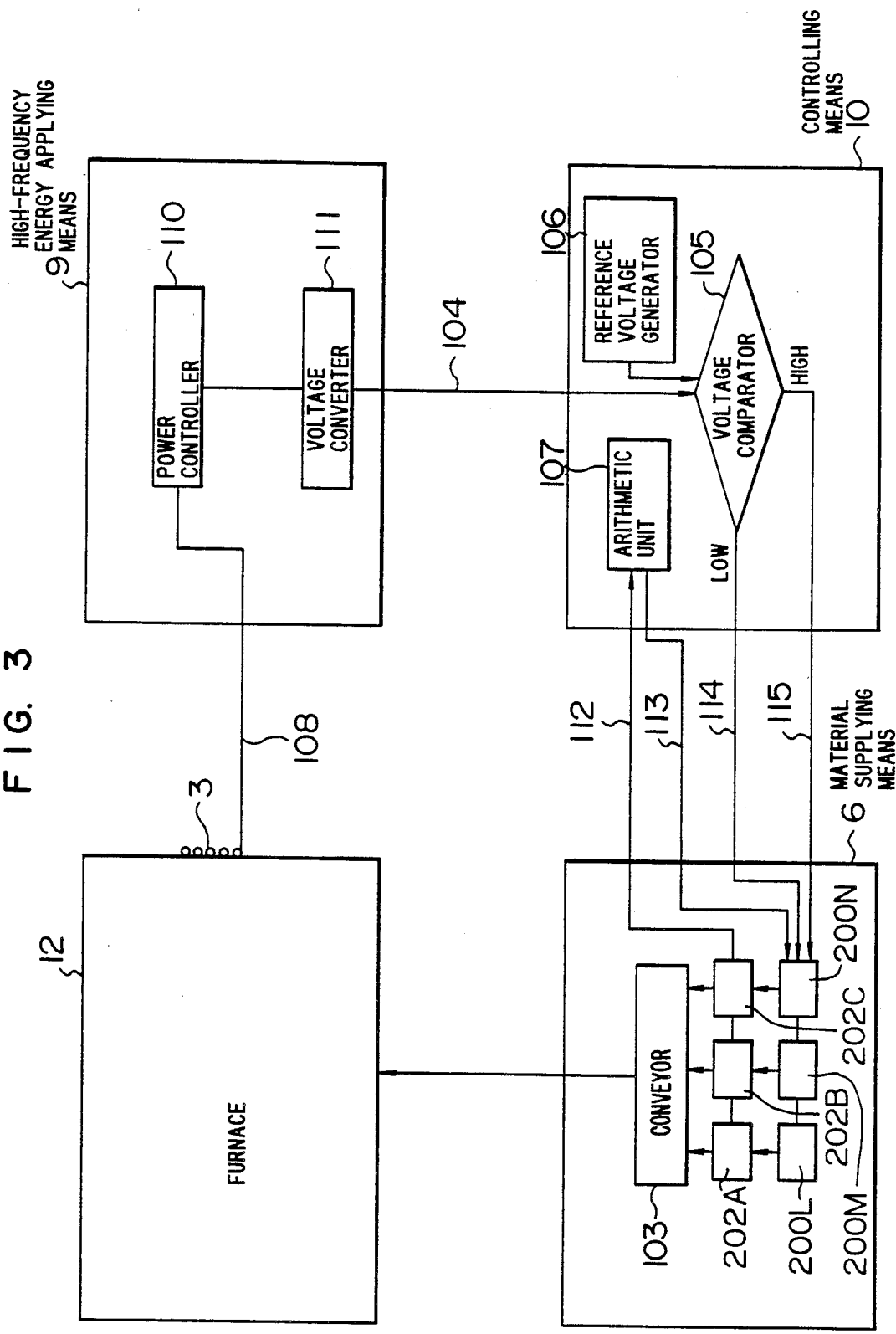
FIG. 3 is a block diagram for explaining the operation of means for supplying a material to be melted.

The operation of the system shown by the block diagram in FIG. 3 is described below.

When the amount of the material to be melted in the furnace 12 is decreased, the impedance of the electromagnetic coil 3 increases. Since the power controller 110 controls the power supplied to the electromagnetic coil 3 of the furnace 12 to be constant, the voltage applied to the electromagnetic coil 3 increases with the increase in the impedance of the electromagnetic coil 3. The same voltage is converted into a corresponding low direct current voltage by the voltage converter 111 and then supplied to the voltage comparator 105 to which is applied the reference voltage from the reference voltage generator 106. Thus, when the voltage from the voltage converter 111 is higher than the reference voltage, a signal is generated from the comparator 105 through the line 115 to each of the material take-out means 200L, 200M and 200N which are thus operated to take out the materials. Each of the take-out means may comprise, in place of the lifting magnet described, an oscillating apparatus for conveying a material onto each of the balances 202A to 202C by applying oscillation to a hopper for the material. In taking out the material, it is not always necessary to precisely measure the material to be melted. In the case of the lifting magnets, the current value may be set, while in the case of the oscillating apparatus, the time required for applying oscillations to the hopper may be set.

In this way, the materials taken out from the hopper under certain conditions are, respectively, precisely weighed by the balances 202A, 202B and 202C which generate weighing data fed into the arithmetic unit 107. In the arithmetic unit 107 is stored desired values of the mixing ratios of the materials to be fed into the furnace 12. Each of the take-out means 200L, 200M and 200N continuously operates so long as the proportion of the integrated amounts of the measurement data of the materials sent through the line 112 is within a predetermined range of a desired value and so long as a signal is being output from the voltage comparator 105 through the line 115. However, if the integrated amount of any one of the three-types of materials exceeds a given range beyond a desired value of the mixing ratio of the material, the arithmetic unit 107 feeds a signal through the line 113 to the material take-out means so as to stop the take-out operation thereof until the integrated amount falls within a predetermined range of the desired value of the mixing ratio.

Each of the thus weighed materials to be melted is supplied to the furnace 12 by the feeding means 103.

The impedance of the electromagnetic coil 3 decreases with an increase in the amount of the material in the furnace 12, so that the voltage applied to the electromagnetic coil 3 is decreased with a resultant decrease in the voltage supplied to the voltage comparator 105 from the voltage converter 111 through the line 104. If the voltage applied to the comparator 105 is lower than the reference voltage, the comparator 105 generates a signal to each of the take-out means 200L, 200M and 200N through the line 114 so as to stop the operation thereof.

As such, the supply apparatus of the present invention is capable of precisely and speedily supplying each material to be melted into the furnace by precisely weighing each material taken out by the corresponding take-out means. The apparatus is not required to weigh respective kinds of materials each time by a weighing apparatus as in the material-supplying apparatus for a cupola.

Each of the balances 202A, 202B and 202C may, for example, be a Roverval's balance provided with a load cell and means for converting weighing data into an electrical signal.

As described above, the apparatus and the method of the present invention employ a carbon material which serves as a heating element in the electromagnetic induction heating and as a reducing agent in refining process. Since the carbon material or an electrically conductive refractory material itself is not exposed to combustion gases, therefore, the consumption thereof is significantly small. In addition, since the carbon material or the electrically conductive refractory material is heated by electromagnetic induction heating in the state wherein the flow of air in the furnace is substantially cut off and no combustion gas is used, a reducing atmosphere in a preferred state can be realized. As a result, it is possible to make a melt of high quality containing greatly reduced amounts of gases such as oxygen and nitrogen. The present invention does not need any particular installation for treating exhaust gases and is thus preferred from the view point of pollution control.

What is claimed is:

1. A method of continuously heating and melting a material, comprising the steps of:
    forming a layer of one of a carbon material and an electrically conductive refractory material on a bottom of a furnace which is provided with a melt outlet adjacent said bottom and an inlet for said one of said carbon material and said electrically conductive refractory material in an upper portion of said furnace;
    heating said layer by electromagnetic induction heating;
    feeding the material to be melted onto the thus heated layer and heating and melting the material to be melted by electromagnetic induction heating;
    substantially inhibiting air flow in said furnace during at least a part of the heating and melting of the material to be melted;
    causing a melt of said material to flow out of said furnace through said melt outlet; and
    determining a value of a ratio between the quantities of heat to be supplied by said electromagnetic induction heating to said layer and said material to be melted, which value of said ratio is necessary to obtain a desired temperature of a melt of said material to be melted flowing out of said furnace; and
    controlling said heat supplied by said electromagnetic induction heating so that said ratio is substantially equal to said determined value.

2. A method according to claim 1, wherein said ratio is controlled by controlling one of parameters comprising the electric power, current and voltage at a power source used for said electromagnetic induction heating and a ratio of the amount of said material to be melted fed into said furnace to the amount of said layer of material is varied to control one of the other parameters.

3. A method according to claim 1, wherein said layer of material is heated before said material to be melted is fed onto said layer of material.

4. A method according to claim 1, wherein a lower portion of said layer of material is heated by a gas sucked from said furnace through said melt outlet before said material to be melted is fed onto said layer of material, said melt outlet is closed when the temperature of an upper portion of said layer of material reaches a temperature at which said material to be melted is melted, a batch of metallic material is fed in an amount smaller in weight than said layer of material and melted, said melt outlet is opened after the lapse of a predetermined time from the feeding of said metallic material, and the material to be melted is again fed onto said layer of material.

5. A method according to claim 1, wherein said layer of material is coke having a specific resistance of 3,000 to 10,000 $\mu\Omega cm$ and said material to be melted is a metallic material.

6. A method according to claim 1, wherein said material to be melted is iron and wherein 20 to 50% of the quantity of heat supplied by said electromagnetic induction heating is applied to said layer of material and the remainder of the heat is applied to the iron, so that melted cast iron at a temperature ranging from 1,400° C. to 1,600° C. is obtained from said melt outlet.

7. A method according to claim 1, wherein said electromagnetic induction heating is performed by applying a high-frequency energy to an electromagnetic coil mounted on the peripheral wall of said furnace.

8. A method according to claim 7, wherein the frequency of said high-frequency energy is 500 to 5,000 Hz and the power thereof is 100 to 10,000 kW.

9. An apparatus for continuously melting a material comprising:
    a furnace having a melt outlet provided adjacent a bottom thereof, said melt outlet adapted to be opened and closed, and an inlet provided in an upper portion of said furnace so that one of a carbon material and an electrically conductive refractory material can be inserted through said inlet and deposited on said bottom of said furnace to form a layer, a material to be melted being fed through said inlet into said furnace onto said layer of deposited material;
    an electromagnetic coil provided around an outer periphery of said furnace;
    means for supplying a high-frequency energy to said electromagnetic coil; and
    means for controlling said supplying means, wherein the material to be melted is melted by electromagnetic induction heating performed by said electromagnetic coil and a flow of air in said furnace is substantially inhibited as melted material flows out of said furnace through said melt outlet, said controlling means further including:

means for setting a value of a ratio between quantities of heat to be supplied by electromagnetic induction heating to said deposited material and to said material to be melted, which value of said ratio is necessary to obtain a desired temperature of a melt of said material to be melted flowing out of said furnace through said melt outlet; and means for controlling said ratio such that the ratio is substantially equal to said set value.

10. An apparatus according to claim 9, wherein said high-frequency energy supplying means controls one of the power, current and voltage of said high-frequency energy, and wherein supply means are provided for supplying said material to be melted into said furnace through said inlet, said controlling means being operative to control said supply means such that the supply of said material to be melted into said furnace is varied to control one of the two remaining parameters.

11. An apparatus according to claim 9, further including a pre-heating means provided above said inlet for pre-heating said material to be melted.

12. An apparatus according to claim 11, wherein said pre-heating means includes a burner.

13. A method according to claim 1, wherein a height of said layer is so determined in relation to a height of a region where an electromagnetic coil is provided that 20 to 50% of the quantity of heat supplied by the electromagnetic induction heating by said electromagnetic coil is applied to said layer and the remainder of the heat is applied to said material to be melted.

14. An apparatus according to claim 9, wherein said deposited material is coke having a specific resistance of 3,000 to 10,000 $\mu\Omega$cm, the frequency of said high-frequency energy supplied to said electromagnetic coil is 500 to 5,000 Hz, the power thereof is 100 to 10,000 kW, and said controlling means operate to change one of the voltage and the current applied to said electromagnetic coil to compensate for a change in the impedance of said electromagnetic coil caused by a supply of said material into said furnace.

15. An apparatus according to claim 9, wherein said material to be melted is iron, and the temperature of melt flowing out of said furnace is 1,400° to 1,600° C.

16. An apparatus according to claim 9, further including supply means for supplying said material to be melted to said inlet, said supply means including means for taking out said material to be melted from a storage thereof, said high-frequency energy applying means including a power controller for keeping constant the power supplied to said electromagnetic coil, and said controlling means including a voltage comparator operative to actuate said take-out means when a voltage received corresponding to the voltage applied to said electromagnetic coil is higher than a reference voltage, and to stop said take-out means when the voltage received is lower than said reference voltage.

17. An apparatus according to claim 16, wherein a plurality of said take-out means are provided so as to respectively take out a plurality of kinds of material to be melted, said supply means further include a plurality of weighing means for respectively weighing said plurality of kinds of said material, said controlling means include an arithmetic unit for receiving weighing data from s id weighing means and integrating the thus received weighing data and judging as to whether or not a ratio between the integrated amounts is within a predetermined range, to thereby control said take-out means such that, when the integrated amount of a kind of material to be melted exceeds said predetermined range, the operation of the corresponding take-out means is stopped.

18. An apparatus according to claim 16, wherein said high-frequency energy applying means includes a voltage converter which converts the high-frequency voltage supplied to said electromagnetic coil into a corresponding low D.C. voltage which is applied to said voltage comparator.

19. An apparatus according to claim 16, wherein said supply means include means for conveying said material to be melted into said furnace, said conveying means comprising one of a belt conveyor and an oscillation conveyor.

20. An apparatus according to claim 16, wherein said take-out means comprise lifting magnets.

21. An apparatus according to claim 16, wherein said take-out means comprise oscillation hoppers.

22. A method of heating and melting a material, comprising the steps of:

forming a layer of a carbon material on a bottom of a furnace which is provided with a melt outlet adjacent said bottom and an inlet for said carbon material and a material to be melted in an upper portion of said furnace;

feeding said material to be melted onto said layer;

applying heat to said layer of carbon material and to said material to be melted by electromagnetic induction heating to melt said material to be melted;

allowing a melt of said material to be melted to flow downwardly through said layer of said carbon material;

causing said carbon material to act as a reducing agent during at least a part of the heat application step;

determining a value of a ratio between quantities of heat to be supplied by said electromagnetic induction heating to said layer of carbon material and to said material to be melted which value is necessary to obtain a desired temperature of a melt of said material to be melted flowing out of said furnace; and controlling said ratio such that the ratio is substantially equal to said determined value.

23. An apparatus for melting a material, comprising:

a furnace having a bottom, a melt outlet provided in said furnace adjacent said bottom, and an inlet provided in an upper portion of said furnace so that a carbon material is inserted into said furnace through said inlet and deposited on said bottom to form a first layer, a material to be melted being fed through said inlet into said furnace onto said first layer to form a second layer;

an electromagnetic coil provided round an outer periphery of said furnace;

means for supplying a high-frequency energy to said electromagnetic coil;

means for controlling said high-frequency energy, said electromagnetic coil being disposed such that said first and second layers are both heated by electromagnetic induction heating performed by said electromagnetic coil to a temperature to melt said material to be melted, a melt of the material to be melted being allowed to move downwardly through said first layer, said furnace being structured so as to cooperate with the induction-heated carbon material and said second layer so as to establish a reducing atmosphere in said furnace during at least a part of the induction heating, said controlling means including:

means for setting a value of a ratio between quantities of heat to be supplied by the electromagnetic induction heating to said first and second layers which value is necessary to obtain a desired temperature of a melt of said material to be melted flowing out of said furnace through said melt outlet; and means for controlling said ratio such that said ratio is substantially equal to said set value.

24. A method of heating and melting a material, comprising the steps of:

forming a layer of a carbon material on a bottom of a furnace which is provided with a melt outlet adjacent said bottom and an inlet for said carbon material and a material to be melted in an upper portion of said furnace;

feeding said material to be melted onto said layer;

applying heat to said layer of carbon material and to said material to be melted by electromagnetic induction heating so as to melt said material to be melted;

determining a value of a ratio between quantities of heat to be supplied by said electromagnetic induction heating to said layer of carbon material and to said material to be melted which value is necessary to obtain a desired temperature of a melt of said material to be melted flowing out of said furnace; and controlling said ratio such that said ratio is substantially equal to said determined value.

25. An apparatus for melting a material, comprising:

a furnace having a bottom, a melt outlet provided in said furnace adjacent said bottom, and an inlet provided in an upper portion of said furnace so that a carbon material is inserted into said furnace through said inlet and deposited on said bottom to form a first layer, a material to be melted being fed through said inlet into said furnace onto said first layer to form a second layer;

an electromagnetic coil provided around an outer periphery of said furnace;

means for supplying a high-frequency energy to said electromagnetic coil; and means for controlling said high-frequency energy, said controlling means being operative to supply quantities of heat by electromagnetic induction heating to said first and second layers to that said material to be melted is melted and flows out of said furnace through said melt outlet at a desired temperature.

* * * * *